United States Patent
Bhogal et al.

(10) Patent No.: US 10,078,709 B2
(45) Date of Patent: *Sep. 18, 2018

(54) MANAGING A DISPLAY OF RESULTS OF A KEYWORD SEARCH ON A WEB PAGE BY MODIFYING ATTRIBUTES OF A DOM TREE STRUCTURE

(71) Applicant: International Business Machines Corporation, Armonk, NY (US)

(72) Inventors: Kulvir S. Bhogal, Pflugerville, TX (US); Lisa Seacat DeLuca, San Francisco, CA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,145

(22) Filed: Nov. 28, 2017

(65) Prior Publication Data

US 2018/0081982 A1 Mar. 22, 2018

Related U.S. Application Data

(63) Continuation of application No. 15/218,441, filed on Jul. 25, 2016, now Pat. No. 9,875,315, which is a
(Continued)

(51) Int. Cl.
*H03M 5/00* (2006.01)
*H03M 7/00* (2006.01)
(Continued)

(52) U.S. Cl.
CPC ........ *G06F 17/30896* (2013.01); *G06F 17/20* (2013.01); *G06F 17/218* (2013.01);
(Continued)

(58) Field of Classification Search
CPC .... G06F 17/20; G06F 17/218; G06F 17/2247; G06F 17/2258; G06F 17/30;
(Continued)

(56) References Cited

U.S. PATENT DOCUMENTS 7,437,660 B1 10/2008 Mehta et al.
7,581,170 B2 * 8/2009 Baumgartner .... G06F 17/30867
715/234

(Continued)

FOREIGN PATENT DOCUMENTS

EP 0774722 5/1997

OTHER PUBLICATIONS

Amendment filed Jan. 20, 2016 in response to Final Office Action (dated Nov. 20, 2015) for U.S. Appl. No. 13/859,866, filed Apr. 10, 2013; Confirmation No. 8346.
(Continued)

*Primary Examiner* — Cesar B Paula
*Assistant Examiner* — Luu-Phuong T Nguyen
(74) *Attorney, Agent, or Firm* — Schmeiser, Olsen & Watts; Michael A. Petrocelli

(57) ABSTRACT

An approach is provided for managing a display of a keyword search result. First Document Object Model (DOM) element(s) in a DOM of a web page are identified as specifying first content that is relevant to the keyword. Second DOM element(s) in the DOM are identified as specifying second content that is irrelevant to the keyword. The display of the result of the search is generated to include the first content and paragraph(s) for viewing according to modified first attribute(s). The paragraph(s) had been hidden previously in a prior display of the web page. The display hides from view the second content according to modified second attribute(s).

13 Claims, 8 Drawing Sheets

Related U.S. Application Data continuation of application No. 13/859,866, filed on Apr. 10, 2013, now Pat. No. 9,448,979.

(51) Int. Cl.

| | | |
|---|---|---|
| *H03M 7/30* | (2006.01) | |
| *G06F 17/30* | (2006.01) | |
| *G06F 17/21* | (2006.01) | |
| *G06F 17/22* | (2006.01) | |
| *G06F 17/20* | (2006.01) | |

(52) U.S. Cl.
CPC ...... *G06F 17/2247* (2013.01); *G06F 17/2258* (2013.01); *G06F 17/30* (2013.01); *G06F 17/30554* (2013.01); *G06F 17/30864* (2013.01); *G06F 17/30011* (2013.01); *G06F 17/30477* (2013.01); *G06F 17/30637* (2013.01); *G06F 17/30873* (2013.01); *G06F 17/30923* (2013.01)

(58) Field of Classification Search
CPC ......... G06F 17/30864; G06F 17/30896; G06F 17/30477; G06F 17/30011; G06F 17/30554; G06F 17/30637; G06F 17/30923; G06F 17/30873; H03M 7/00; H03M 7/30; H03M 5/00; H04L 29/12009
USPC ........................................................ 715/234
See application file for complete search history.

(56) References Cited

U.S. PATENT DOCUMENTS

| | | | | |
|---|---|---|---|---|
| 7,899,818 | B2 | 3/2011 | Stonehocker et al. | |
| 7,941,419 | B2 * | 5/2011 | Bhatkar | G06F 21/31 707/708 |
| 8,078,630 | B2 | 12/2011 | Dexter et al. | |
| 8,511,565 | B2 * | 8/2013 | Lapstun | G06F 17/30864 235/487 |
| 8,843,850 | B2 * | 9/2014 | Barros | G06F 17/30241 715/810 |
| 9,448,979 | B2 | 9/2016 | Bhogal et al. | |
| 2004/0193584 | A1 | 9/2004 | Ogawa et al. | |
| 2005/0022115 | A1 | 1/2005 | Baumgartner et al. | |
| 2005/0149576 | A1 | 7/2005 | Marmaros et al. | |
| 2009/0276694 | A1 | 11/2009 | Henry et al. | |
| 2010/0131494 | A1 | 5/2010 | Venolia | |
| 2010/0299589 | A1 | 11/2010 | Yamada | |
| 2011/0191326 | A1 | 8/2011 | Gutlapalli et al. | |
| 2011/0302486 | A1 | 12/2011 | Jia | |
| 2013/0238978 | A1 | 9/2013 | Jwa et al. | |
| 2013/0346851 | A1 | 12/2013 | Leece | |
| 2014/0310588 | A1 | 10/2014 | Bhogal et al. | |
| 2016/0335368 | A1 | 11/2016 | Bhogal et al. | |

OTHER PUBLICATIONS

Amendment filed Sep. 8, 2015 in response to Office Action (dated Jun. 8, 2015) for U.S. Appl. No. 13/859,866, filed Apr. 10, 2013; Confirmation No. 8346.

Better Ad Blocking for Firefox, Mozilla, Camino, and Safari also works with the Thunderbird email claim! [retrieved on Oct. 29, 2012]; Retrieved from the Internet: URL: http://www.floppymoose.com/; 4 pages.

Final Office Action (dated Nov. 20, 2015) for U.S. Appl. No. 13/859,866, filed Apr. 10, 2013; Confirmation No. 8346.

Hide Images, browser extension for Firefox, Chrome, Safari (Win, Mac, Linus); [retrieved on Oct. 29, 2012] Retrieved from the Internet: URL: http://www.hideimages.net/; 1 page.

Hiding/showing elements, Now you see me, [retrieved on Oct. 29, 2012], Retrieved from the Internet: URL: http://www.javascriptkit.com/javatutors/dom3.shtml; 2 pages.

Notice of Allowance (dated Jun. 7, 2016) for U.S. Appl. No. 13/859,866, filed Apr. 10, 2013; Confirmation No. 8346.

Office Action (dated Jun. 8, 2015) for U.S. Appl. No. 13/859,866, filed Apr. 10, 2013; Confirmation No. 8346.

Show/hide DOM elements in all browsers; [retrieved on Oct. 29, 2012]; Retrieved from the Internet: URL: http://stackoverflow.com/questions/6183872/show-hide-dom-elements-in-all-browsers; 3 pages.

Notice of Allowance (dated Sep. 13, 2017) for U.S. Appl. No. 15/218,441, filed Jul. 25, 2016; Confirmation No. 5412.

* cited by examiner 300-1

Dozens of video-capable smartphones -- most of them Steve Jobs' own creations -- peered out over the sea of technology journalists like digital periscopes.

Nothing particularly video-worthy was going on in that moment: It was January 2010, and a bunch of us tech writers, wearing plaid and skinny jeans and funny hats, were waiting in line outside the Yerba Buena Center in San Francisco for an [Apple] news conference.

But a line outside a news conference where Steve Jobs will appear is no normal line. It's the kind of thing you might just want to record every second of. And so, when our media handlers, wearing bright T-shirts with the simple [Apple] logo, let us into the building where Jobs would unveil his company's "magical" iPad, pretty much everyone in the audience raised his or her iPhone in unison and clicked "record."

I'm sure our collective scramble down a hall toward a dimly lit auditorium was recorded and uploaded dozens of times.

[Apple]'s revolutionary co-founder, who died Wednesday at the age of 56, had that kind of power over people -- even the ostensibly objective technology press corps, which breathlessly hangs on [Apple]'s announcements as if their gadgets have the power to change the world.

Which, if we're being honest, they do.

"The world has lost a visionary," President Barack Obama said in a 300-2 statement posted Wednesday night on the White House blog. "And there may be no greater tribute to Steve's success than the fact that much of the world learned of his passing on a device he invented."

"So much talk on Twitter of Steve Jobs, but Twitter HQ has been eerily quiet the past few hours save the clicking of keyboards he tailored," Twitter designer Mark Trammell posted on his popular Twitter feed. All around the world, it seems, people used the technology Jobs created to remark on his impact and his passing -- a testament to the personal impact [Apple]'s suite of iProducts has on many of our lives.

Regardless of your technological tack -- whether you're addicted to that red light that blinks on top of the BlackBerry or swear your allegiance to the Android overlords -- it's hard to deny the industry-changing power of Jobs and the [Apple] brand. Before the iPhone, an app-running, touch-screen device didn't exist. It was the first true smartphone, just as the iPad was the first true tablet computer. But way before that, back in a California garage in the 1970s, Steve Jobs and Steve Wozniak essentially kick-started the personal computer revolution. In part, I owe the fact that I'm able to type this story and send it to you over the Internet to the vision of Jobs and Wozniak.

If the technological history explains part of the hype that surrounds every press conference Jobs presided over, his personal life tells more of the story.

Gallery: Steve Jobs' life offstage

After we iPhone-holding hordes made our way into the auditorium where Jobs would reveal Apple's tablet computer, I took a seat next to a buttoned-up tech analyst and noticed the music playing over the loudspeakers: Bob Dylan's "Like a Rolling Stone."

"How does it feeeeeeeel...." Wired wrote on its live blog of the event, quoting the lyrics. (In case you're not familiar with that phenomenon, tech bloggers, myself included, post -- instantly and publicly -- pretty much every word Steve Jobs utters at these press conferences. Apple doesn't allow live video feeds, so these insta-blogs are the only way to get information about new Apple gadgets out to the salivating public in real time).

When Jobs emerged, the audience greeted him with a standing ovation. Again -- all iPhones in the air.

As he paced the stage in front of a massive, glowing PowerPoint-style presentation, wearing his trademark mom jeans and black turtleneck, a scruffy beard and Harry Potter glasses on his face, writers hung on his every word.

He told us the iPad would be "truly magical and revolutionary," and the doubters believed him.

"I went into it prepared to be very skeptical," Ars Technica's Jacqui Cheng told me after the event, "but I was impressed."

300-4

That's partly because Jobs carried weight like no one else in the industry. His presentations were the rock concerts of the technology world. His ability to connect new gadgets with human wants and desires -- their ability not just to make you a productive worker but to connect you with loved ones -- took them to another level.

His onstage charisma is something everyone since -- most notably Facebook's Mark Zuckerberg -- has tried to imitate, without quite the same success.

That's partly because of style but also because of history.

Jobs' status as a counterculture figure -- the kind of guy who loves Bob Dylan, whose company asks fans to "think different," and who went on a find-yourself pilgrimage in India, where he experimented with psychedelic drugs -- puts him in a more sacred place in the public consciousness than other tie-wearing tech execs, who seem like photocopies of each other compared to someone with Jobs' rich personal history.

No one videotapes the walk into a Microsoft press conference hosted by Steve Ballmer, for instance. I've been to those, too.

Jobs' story is almost painfully American and it reads like a screenplay: Driven individual from humble beginnings sells Volkswagen bus to found company in his family's garage; in process, revolutionizes music, digital movies, computing and mobile tech.

"To technology freaks and geeks, he is a 'demigod', whose product launches are adulatory affairs regularly likened to religious revivalist meetings," the British newspaper The Guardian wrote in 2006. "The Jobs life story -- humble birth, rise and fall, then miraculous comeback -- has even been likened by Apple fanatics to the heroic myths of Odysseus, Jason, Krishna and Christ."

Maybe all this, in part, explains why the suit-wearing analyst sitting next to me at the 2010 iPad event literally shrieked with joy when Jobs announced some details of that tablet, including a detachable keyboard he could use to file reports on the go.

I don't claim to fully comprehend the pandemonium that surrounds a Steve Jobs press conference. In June 2010, about six months after the iPad event, I attended Apple's World Wide Developer Conference (known to insiders as WWDC) at San Francisco's Moscone Center. That massive glass building was cloaked in an Apple logo big enough to have its own ZIP code. Inside, the usual suspects were waiting for a chance to see Jobs unveil the latest-generation iPhone, which turned out to be the iPhone 4.

I was in a pack of tech bloggers waiting behind a velvet rope, just outside the giant conference room where the event would be held. We were talking about all the latest iPhone rumors -- would it really be a game changer, etc. -- when security guards (really) lifted the velvet rope to let us in. Keep in mind there were maybe 100 writers and photographers covering this event and we were getting let in before anyone else -- to choose our seats in a room with at least 2,000 chairs.

300-6

Bottom line: We were getting really good seats, no problem.

Still, the moment that rope lifted, there was a mad rush.

I didn't expect it at all, and almost got knocked out of the way as these laptop- and camera-toting journalists sprinted -- literally sprinted -- into the empty news conference.

At the time, I thought this was completely insane.

But, upon reflection, I don't condone it, but I get it.

They were rushing not to hear about the iPhone 4. They wanted the best chance possible to get close to a man who's been described as the Thomas Edison of our time. A legend.

A man who, in his own words, "put a dent in the universe."

You don't get that kind of opportunity every day.

Nothing particularly video-worthy was going on in that moment: It was January 2010, and a bunch of us tech writers, wearing plaid and skinny jeans and funny hats, were waiting in line outside the Yerba Buena Center in San Francisco for an [Apple] news conference.

But a line outside a news conference where Steve Jobs will appear is no normal line. It's the kind of thing you might just want to record every second of. And so, when our media handlers, wearing bright T-shirts with the simple [Apple] logo, let us into the building where Jobs would unveil his company's "magical" iPad, pretty much everyone in the audience raised his or her iPhone in unison and clicked "record."

[Apple]'s revolutionary co-founder, who died Wednesday at the age of 56, had that kind of power over people -- even the ostensibly objective technology press corps, which breathlessly hangs on [Apple]'s announcements as if their gadgets have the power to change the world.

"So much talk on Twitter of Steve Jobs, but Twitter HQ has been eerily quiet the past few hours save the clicking of keyboards he tailored," Twitter designer Mark Trammell posted on his popular Twitter feed. All around the world, it seems, people used the technology Jobs created to remark on his impact and his passing -- a testament to the personal impact [Apple]'s suite of iProducts has on many of our lives.

400-2

Regardless of your technological tack -- whether you're addicted to that red light that blinks on top of the BlackBerry or swear your allegiance to the Android overlords -- it's hard to deny the industry-changing power of Jobs and the [Apple] brand. Before the iPhone, an app-running, touch-screen device didn't exist. It was the first true smartphone, just as the iPad was the first true tablet computer. But way before that, back in a California garage in the 1970s, Steve Jobs and Steve Wozniak essentially kick-started the personal computer revolution. In part, I owe the fact that I'm able to type this story and send it to you over the Internet to the vision of Jobs and Wozniak.

After we iPhone-holding hordes made our way into the auditorium where Jobs would reveal [Apple]'s tablet computer, I took a seat next to a buttoned-up tech analyst and noticed the music playing over the loudspeakers: Bob Dylan's "Like a Rolling Stone."

"How does it feeeeeeeel...." Wired wrote on its live blog of the event, quoting the lyrics. (In case you're not familiar with that phenomenon, tech bloggers, myself included, post -- instantly and publicly -- pretty much every word Steve Jobs utters at these press conferences. [Apple] doesn't allow live video feeds, so these insta-blogs are the only way to get information about new [Apple] gadgets out to the salivating public in real time).

"To technology freaks and geeks, he is a 'demigod', whose product launches are adulatory affairs regularly likened to religious revivalist meetings," the British newspaper The Guardian wrote in 2006. "The Jobs life story -- humble birth, rise and fall, then miraculous comeback -- has even been likened by Apple fanatics to the heroic myths of Odysseus, Jason, Krishna and Christ."

I don't claim to fully comprehend the pandemonium that surrounds a Steve Jobs press conference. In June 2010, about six months after the iPad event, I attended Apple's World Wide Developer Conference (known to insiders as WWDC) at San Francisco's Moscone Center. That massive glass building was cloaked in an Apple logo big enough to have its own ZIP code. Inside, the usual suspects were waiting for a chance to see Jobs unveil the latest-generation iPhone, which turned out to be the iPhone 4.

*FIG. 4B*

MANAGING A DISPLAY OF RESULTS OF A KEYWORD SEARCH ON A WEB PAGE BY MODIFYING ATTRIBUTES OF A DOM TREE STRUCTURE

This application is a continuation application claiming priority to Ser. No. 15/218,441 filed Jul. 25, 2016 which is a continuation application claiming priority to Ser. No. 13/859,866 filed Apr. 10, 2013, which is now U.S. Pat. No. 9,448,979 issued Sep. 20, 2016.

TECHNICAL FIELD

The present invention relates to a data processing method and system for managing a display of search results, and more particularly to a technique for managing a display of results of a keyword search provided by a search feature of a browser.

BACKGROUND

While a webpage is being displayed, a user inputs a search term into a search feature of a browser and the browser subsequently searches for the search term on the webpage. Some browsers, such as the Google® Chrome® browser, may highlight all of the terms on the webpage that match the search term, for easy recognition of the occurrences of the search term on the webpage. The Google® Chrome® browser is a freeware web browser developed by Google, Inc. located in Mountain View, Calif. Google, Google Chrome, and Chrome are registered trademarks of Google, Inc. A browser may also jump to the location of a search term in response to the user pressing a key (e.g., the up or down arrow key) of a keyboard, or activating a graphical user interface (GUI) element (e.g., an onscreen button). For a webpage that includes a large amount of content, the user may be required to perform a significant amount of scrolling to view all of the highlighted search terms resulting from the search feature of a browser. Furthermore, content on the webpage that is irrelevant to the search term is displayed with the same prominence as the content that is relevant to the search term, thereby making it difficult for the user to ignore the irrelevant content.

BRIEF SUMMARY

In first embodiments, the present invention provides a method of managing a display of a result of a search for a keyword on a web page. The method includes a computer receiving the keyword for the search. The method further includes the computer searching for the keyword on the web page by identifying a first set of one or more elements of a Document Object Model (DOM element(s)) of the web page that include a first subset of DOM element(s) that include the keyword and optionally includes a second subset of DOM element(s) that are related to the first subset of DOM element(s) based on preference(s) associated with the display. The method further includes based on the preference(s), the computer identifying a second set of DOM element(s) of the web page that are unrelated to the first subset of DOM element(s). The method further includes based on the preference(s), the computer modifying first attribute(s) of a style of the identified first set of DOM element(s) and modifying second attribute(s) of a style of the identified second set of DOM element(s). The method further includes the computer generating the display of the result of the search so that the display includes content of the web page specified by the first set of DOM element(s) in accordance with the modified first attribute(s), and so that the display (1) does not include other content of the web page specified by the second set of DOM element(s) in accordance with the modified second attribute(s) or (2) emphasizes the content specified by the first set of DOM element(s) over the other content specified by the second set of DOM element(s) in accordance with a difference between the modified first and second attribute(s).

In second embodiments, the present invention provides a computer system including a central processing unit (CPU); a memory coupled to the CPU; and a computer-readable, tangible storage device coupled to the CPU. The storage device contains instructions that when executed by the CPU via the memory implement a method of managing a display of a result of a search for a keyword on a web page. The method includes the computer system receiving the keyword for the search. The method further includes the computer system searching for the keyword on the web page by identifying a first set of one or more elements of a Document Object Model (DOM element(s)) of the web page that include a first subset of DOM element(s) that include the keyword and optionally includes a second subset of DOM element(s) that are related to the first subset of DOM element(s) based on preference(s) associated with the display. The method further includes based on the preference(s), the computer system identifying a second set of DOM element(s) of the web page that are unrelated to the first subset of DOM element(s). The method further includes based on the preference(s), the computer system modifying first attribute(s) of a style of the identified first set of DOM element(s) and modifying second attribute(s) of a style of the identified second set of DOM element(s). The method further includes the computer system generating the display of the result of the search so that the display includes content of the web page specified by the first set of DOM element(s) in accordance with the modified first attribute(s), and so that the display (1) does not include other content of the web page specified by the second set of DOM element(s) in accordance with the modified second attribute(s) or (2) emphasizes the content specified by the first set of DOM element(s) over the other content specified by the second set of DOM element(s) in accordance with a difference between the modified first and second attribute(s).

In third embodiments, the present invention provides a computer program product. The computer program product includes a computer-readable, tangible storage device; and a computer-readable program code stored in the computer-readable, tangible storage device. The computer-readable program code contains instructions that are executed by a central processing unit (CPU) of a computer system to implement a method of managing a display of a result of a search for a keyword on a web page. The method includes the computer system receiving the keyword for the search. The method further includes the computer system searching for the keyword on the web page by identifying a first set of one or more elements of a Document Object Model (DOM element(s)) of the web page that include a first subset of DOM element(s) that include the keyword and optionally includes a second subset of DOM element(s) that are related to the first subset of DOM element(s) based on preference(s) associated with the display. The method further includes based on the preference(s), the computer system identifying a second set of DOM element(s) of the web page that are unrelated to the first subset of DOM element(s). The method further includes based on the preference(s), the computer system modifying first attribute(s) of a style of the identified first set of DOM element(s) and modifying second attribute(s) of a style of the identified second set of DOM element(s). The method further includes the computer system generating the display of the result of the search so that the display includes content of the web page specified by the first set of DOM element(s) in accordance with the modified first attribute(s), and so that the display (1) does not include other content of the web page specified by the second set of DOM element(s) in accordance with the modified second attribute(s) or (2) emphasizes the content specified by the first set of DOM element(s) over the other content specified by the second set of DOM element(s) in accordance with a difference between the modified first and second attribute(s).

In fourth embodiments, the present invention provides a process of supporting computing infrastructure. The process includes a step of integrating computer-readable program code into a computer system comprising a processor. The step of integrating includes storing the program code in a computer-readable storage device of the computer system through use of the processor. The program code, upon being executed by the processor, implements a method of managing a display of a result of a search for a keyword on a web page. The method includes the computer system receiving the keyword for the search. The method further includes the computer system searching for the keyword on the web page by identifying a first set of one or more elements of a Document Object Model (DOM element(s)) of the web page that include a first subset of DOM element(s) that include the keyword and optionally includes a second subset of DOM element(s) that are related to the first subset of DOM element(s) based on preference(s) associated with the display. The method further includes based on the preference(s), the computer system identifying a second set of DOM element(s) of the web page that are unrelated to the first subset of DOM element(s). The method further includes based on the preference(s), the computer system modifying first attribute(s) of a style of the identified first set of DOM element(s) and modifying second attribute(s) of a style of the identified second set of DOM element(s). The method further includes the computer system generating the display of the result of the search so that the display includes content of the web page specified by the first set of DOM element(s) in accordance with the modified first attribute(s), and so that the display (1) does not include other content of the web page specified by the second set of DOM element(s) in accordance with the modified second attribute(s) or (2) emphasizes the content specified by the first set of DOM element(s) over the other content specified by the second set of DOM element(s) in accordance with a difference between the modified first and second attribute(s).

Embodiments of the present invention allow keyword search results to be viewed quickly with a small amount of scrolling, because only relevant content is displayed and unrelated content is hidden from the user's view. While viewing search results, a user quickly ascertains the context around a keyword while easily ignoring information that is not related to the keyword. Furthermore, a user experiences more efficient web surfing because embodiments of the present invention avoid a need to manually hide certain elements that are not relevant to a keyword.

BRIEF DESCRIPTION OF THE DRAWINGS

FIGS. 3A-3C is an example of a result of a search for a keyword on a web page that is generated with a known keyword search technique and without using the process of FIG. 2.

FIGS. 4A-4B is an example of a result of a search for the same keyword on the same web page used in FIGS. 3A-3C, where the result is generated with the process of FIG. 2, in accordance with embodiments of the present invention.

DETAILED DESCRIPTION

Overview

Figure 1:
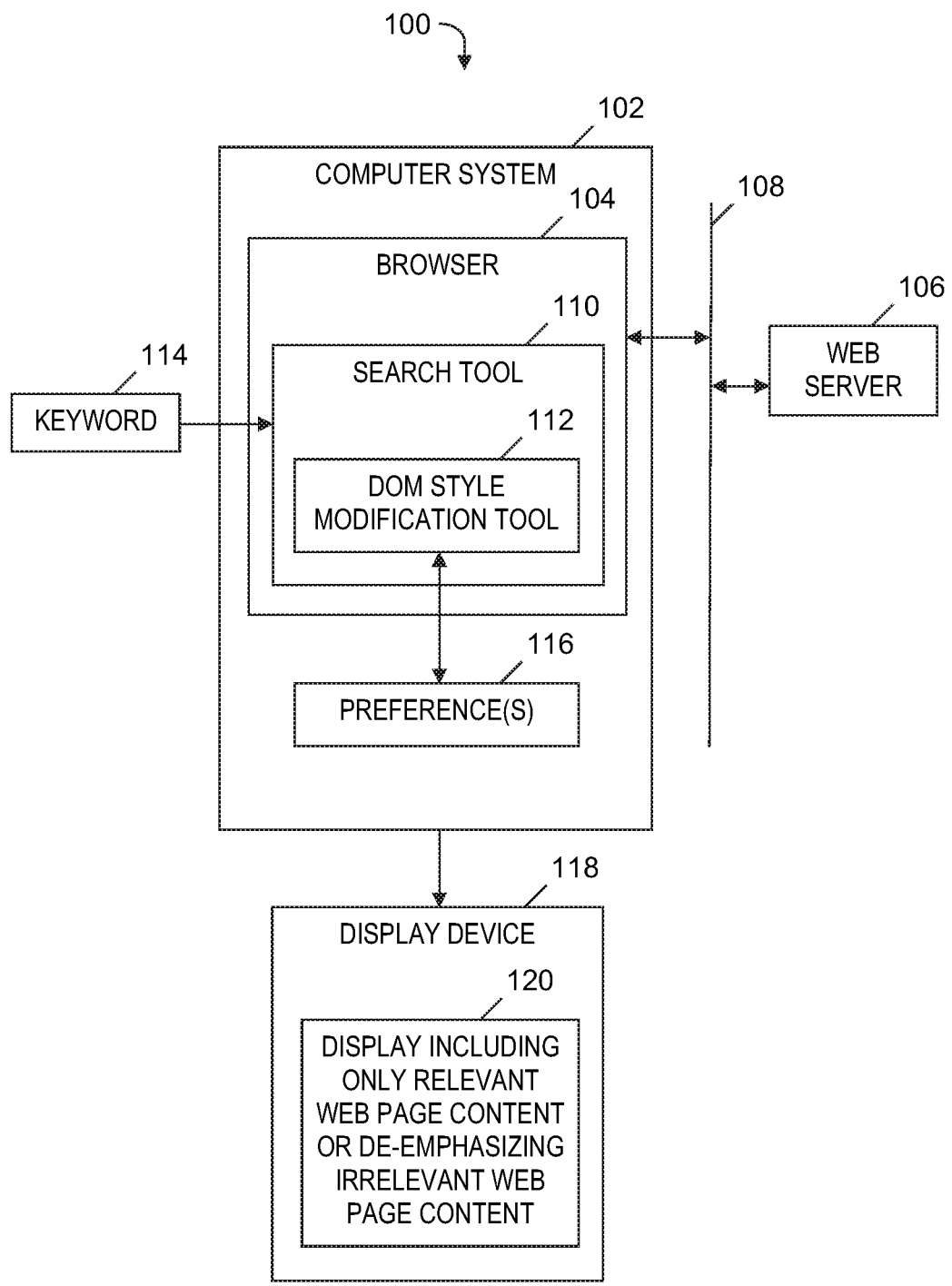
FIG. 1 is a block diagram of a system for managing a display of a result of a search for a keyword on a web page, in accordance with embodiments of the present invention.

Embodiments of the present invention enhance the handling of results of keyword searching on a web page. A web browser's existing search features are enhanced to modify styles of Document Object Model (DOM) elements that do not include a keyword and are unrelated to DOM elements that include the keyword. Preferences determine that particular levels of DOM elements relative to a level of a DOM element that includes a keyword indicate that the DOM elements are either related or unrelated to the DOM element that includes the keyword.

In one embodiment, the web browser's search feature identifies the DOM elements that are unrelated to each of the DOM elements that include the keyword. The web browser subsequently generates a display of the search results that includes the web page content specified by DOM elements that include the keyword and optionally other DOM elements related to the DOM elements that include the keyword, in accordance with the preferences. Generating the display of the search results removes from view the web page content specified by DOM elements that are unrelated to the DOM elements that include the keyword, so that the remaining, viewable content is related to the keyword and is viewable by employing a smaller amount of scrolling than the amount of scrolling required by known techniques to view the results of a search for the same keyword on the same web page.

In an alternate embodiment, the web browser's search feature identifies the DOM elements that include the keyword and optionally other DOM elements that are related to the DOM elements that include the keyword. The web browser subsequently generates a display of search results that includes only web page content specified by DOM elements that are unrelated to the identified DOM elements that include the keyword, in accordance with the preferences. In the embodiment described in this paragraph, generating the display of search results removes from view the web page content specified by the identified DOM elements, thereby leaving viewable only the web page content that is unrelated to the keyword. The remaining, viewable web page content unrelated to the keyword is viewable by employing a smaller amount of scrolling than the amount of scrolling required by known techniques to view the same web page content (i.e., content unrelated to the keyword) in the results of a search for the same keyword on the same web page.

Using known techniques that provide search results as a feature of a web browser, viewing highlighted keywords in the search results is slow when there is a significant amount of scrolling required due to a large amount of content appearing in the search results that is unrelated to the keyword, thereby posing unique challenges. A user may use known approaches to manually hide content that is unrelated to the keyword, but this manual process is time-consuming and error-prone, thereby posing other unique challenges. At least one of these unique challenges is overcome by one or more embodiments of the present invention.

As used herein, Document Object Model (DOM) is defined to be a World Wide Web Consortium (W3C) specification for application program interfaces that provides a platform-neutral and language-independent way to represent, interact with, and process a structured document, such as a HyperText Markup Language (HTML) document. The DOM is used to represent an HTML document as a hierarchical tree structure (i.e., a DOM tree). One member of the DOM tree is a DOM element. Each HTML element in an HTML document corresponds to a respective DOM element in the DOM tree.

As used herein, Cascading Style Sheets (CSS) is defined as the W3C specification of an extension to HTML for describing the presentation semantics of an HTML document, thereby allowing styles (e.g., color, font, size, and opacity) to be specified for particular elements of an HTML document. CSS also allows a style to be removed for HTML document elements that belong to a specific class.

System for Managing a Display of Search Results

FIG. 1 is a block diagram of a system for managing a display of a result of a search for a keyword on a web page, in accordance with embodiments of the present invention. System 100 includes a computer system 102, which runs a software-based web browser 104. Web browser 104 is in communication with a web server 106 via a computer network 108. In one embodiment, network 108 is the Internet. In another embodiment, network 108 is an intranet. Web browser 104 includes a software-based search tool 110 whose program code is configured to receive a keyword 114 entered by a user of computer system 102, search a web page for keyword 114, and generate results of the search (e.g., display the web page with occurrences of keyword 114 highlighted). As used herein, "keyword" includes one or more search terms that a user enters into a search feature of web browser 104, where the search feature searches for and identifies occurrence(s) of the one or more search terms in the content of a web page.

Search tool 110 includes DOM style modification tool 112, which extends known search features of web browser 104 and search tool 110. DOM style modification tool 112 identifies mutually exclusive first and second sets of DOM element(s) of the web page. The first set of DOM element(s) (1) includes keyword 114 or (2) includes a first subset of DOM element(s) that include keyword 114 and a second subset of DOM element(s) that are related to the first subset of DOM element(s) based on preference(s) 116. The second set of DOM element(s) do not include keyword 114 and, based on preference(s) 116, are not related to the first subset of DOM element(s).

In one embodiment, preference(s) 116 indicate relatedness between each DOM element in the second subset and a corresponding DOM element in the first subset based on their hierarchical relationship in a DOM tree (i.e., one DOM element is a parent, child, or sibling of the other). Preference(s) 116 are stored in a computer data storage device (not shown) coupled to computer system 102.

Computer system 102 is coupled to a display device 118. DOM style modification tool generates a display 120 that is viewable by a user of computer system 102. Display 120 (1) includes only content on the web page that is relevant to keyword 114, where the content that is not relevant to keyword 114 has been hidden or otherwise removed from display 120 by DOM style modification tool 112, or (2) includes content that is relevant to keyword 114 and content that is irrelevant to keyword 114, but with the irrelevant content being visually de-emphasized as compared to the relevant content. As used herein, relevant content (i.e., content of a web page that is relevant to keyword 114) is content specified by a DOM element that includes keyword 114 or is related by preference(s) 116 to keyword 114. As used herein, irrelevant content (i.e., content of a web page that is irrelevant to keyword 114) is content specified by a DOM element that does not include keyword 114 and is not related by preference(s) to keyword 114.

In one embodiment, based on preference(s) 116, DOM style modification tool 112 modifies a style of the identified first set of DOM element(s) and a style of the identified second set of DOM element(s) that are unrelated to the aforementioned first subset of DOM element(s). Based on the modified styles, DOM style modification tool 112 generates a display 120 of a result of the search for keyword 114. In one embodiment, display 120 includes only content of the web page that is relevant to keyword 114 based on preference(s) 116 (i.e., DOM style modification tool 112 generates display 120 in which the content of the web page that is not relevant to keyword 114 is hidden or otherwise removed from view). In an alternate embodiment, display 120 visually de-emphasizes the content of the web page that is not relevant to keyword 114 as compared to the content of the web page that is relevant to keyword 114.

In another embodiment (not shown), DOM style modification tool 112 generates display 120 so that the content of the web page that is relevant to keyword 114 is hidden or otherwise removed from view.

Figure 2:
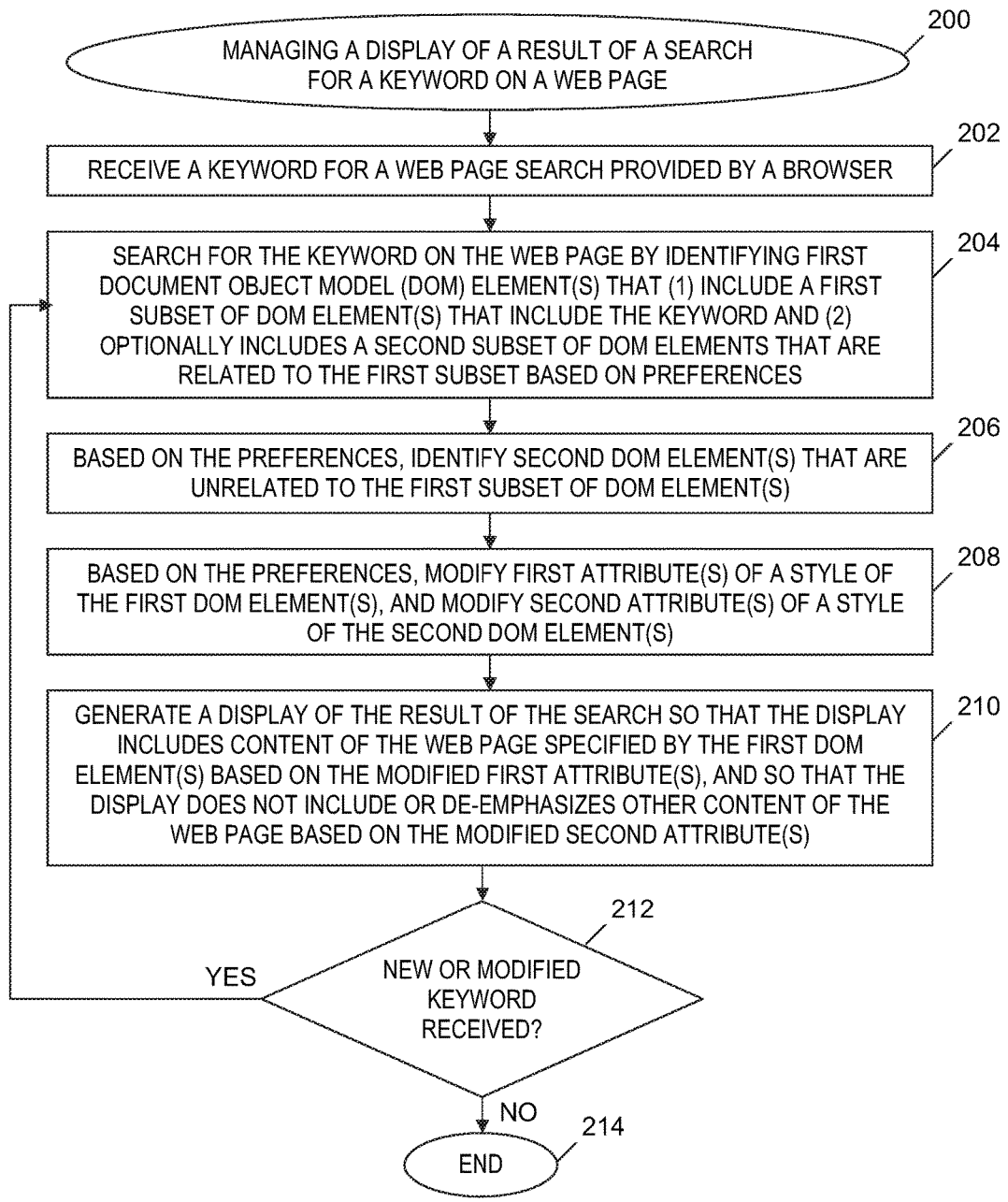
FIG. 2 is a flowchart of a process of managing a display of a result of a search for a keyword on a web page, where the process is implemented in the system of FIG. 1, in accordance with embodiments of the present invention.
Figure 5:
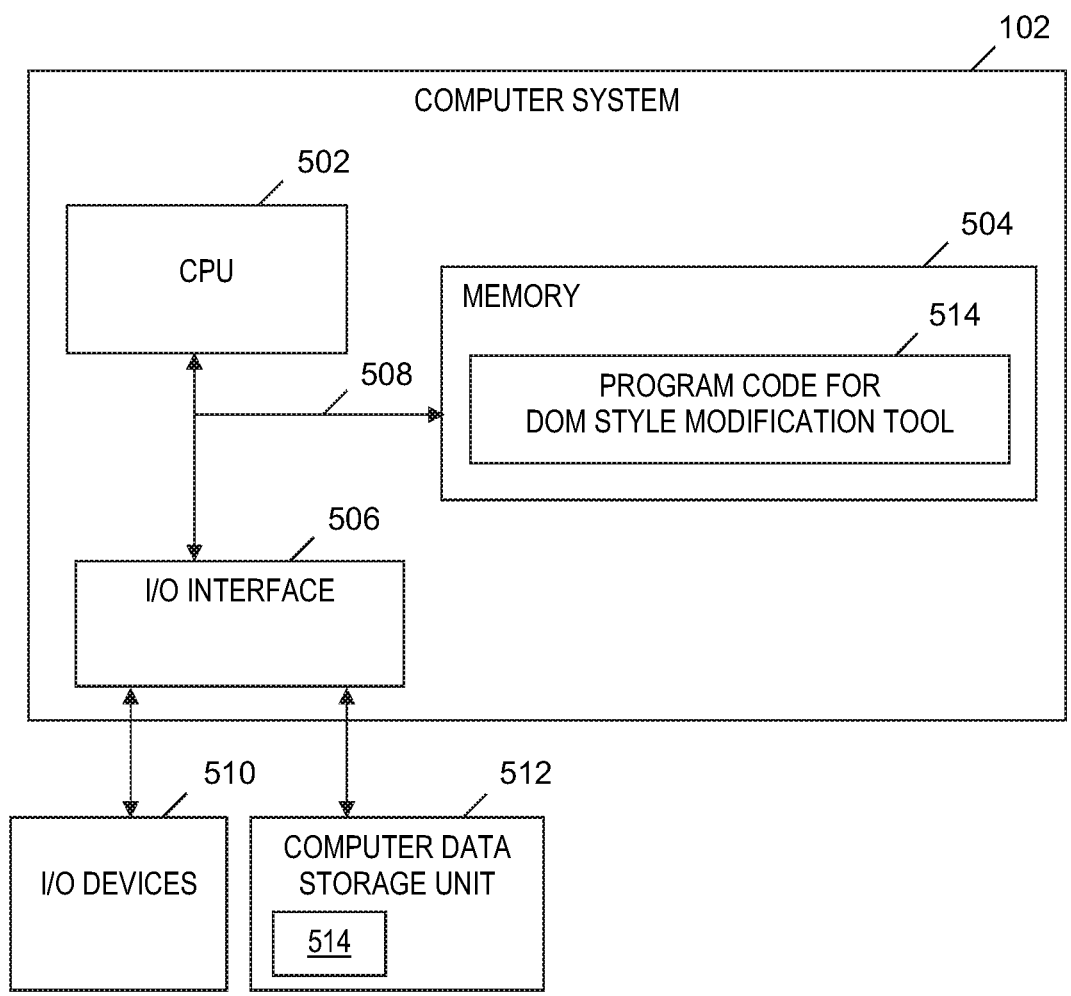
FIG. 5 is a block diagram of a computer system that is included in the system of FIG. 1 and that implements the process of FIG. 2, in accordance with embodiments of the present invention.

The functionality of the components shown in FIG. 1 is described in more detail in the discussion of FIG. 2 and FIG. 5 presented below.

Process for Managing a Display of Search Results

FIG. 2 is a flowchart of a process of managing a display of a result of a search for a keyword on a web page, where the process is implemented in the system of FIG. 1, in accordance with embodiments of the present invention. The process of FIG. 2 begins at step 200. In step 202, search tool 110 (see FIG. 1) receives keyword 114 (see FIG. 1) for a search for keyword 114 (see FIG. 1) on a web page, where the search is provided by web browser 104 (see FIG. 1). In one embodiment, a user of computer system 102 (see FIG. 1) types keyword 114 (see FIG. 1) into a search field provided by browser 104 (see FIG. 1).

In step 204, DOM style modification tool 112 (see FIG. 1) searches for keyword 114 (see FIG. 1) on the web page by identifying a first set of DOM element(s) of the web page that includes a first subset of DOM element(s) that include keyword 114 (see FIG. 1) and includes a second subset of DOM element(s) that are related to the first subset of DOM element(s) based on preference(s) 116 (see FIG. 1).

In step 204, identifying the first subset of DOM element(s) that includes keyword 114 (see FIG. 1) includes DOM style modification tool 112 (see FIG. 1) analyzing DOM elements corresponding to the HTML elements of the web page to determine which DOM elements include keyword 114 (see FIG. 1), and determining the parent DOM element of each of the found occurrences of keyword 114 (see FIG. 1). Examples of HTML elements corresponding to DOM elements in which keyword 114 (see FIG. 1) may be found include elements having the following tags: <div>, <p>, <a> and <header>.

In step 204, identifying the second subset of DOM element(s) as being related to the first subset of DOM element(s) includes DOM style modification tool 112 (see FIG. 1) analyzing preference(s) 116 (see FIG. 1) that indicate a hierarchical relationship in the DOM tree between a DOM element in the first subset and respective DOM element(s) in the second subset. A preference included in preference(s) 116 (see FIG. 1) indicates a first DOM element is related to a second DOM element if the first DOM element is a parent, child or sibling of the second DOM element in the DOM tree. In one embodiment, a preference in preference(s) 116 (see FIG. 1) indicates multiple levels DOM element parents and/or multiple levels of DOM element children in the DOM tree that are considered to be related to a DOM element in the first subset of DOM element(s). In one embodiment, a preference in preference(s) 116 (see FIG. 1) indicates a maximum number of DOM elements that are siblings and placed before a DOM element in the first subset, where the siblings are considered related to the DOM element in the first subset. In one embodiment, a preference in preference(s) 116 (see FIG. 1) indicates a maximum number of DOM elements that are siblings and placed after a DOM element in the first subset, where the siblings are considered related to the DOM element in the first subset.

In an alternate embodiment, step 204 includes DOM style modification tool 112 (see FIG. 1) searching the web page for keyword 114 (see FIG. 1) and identifying only the aforementioned DOM element(s) on the web page that include keyword 114 (see FIG. 1) (i.e., without identifying other DOM elements that are related to the DOM element that includes keyword 114 (see FIG. 1)).

In one embodiment, prior to step 204, DOM style modification tool 112 (see FIG. 1) receives or determines relation(s) to a DOM element included in the first set of DOM element(s), where a relation included in the relation(s) is (1) a number of level(s) of DOM element(s) of the web page that are parent(s) of the DOM element; (2) a number of level(s) of DOM element(s) of the web page that are one or more children of the DOM element; (3) a number of DOM element(s) of the web page that are sibling(s) of the DOM element and that are positioned before the DOM element in the DOM; or (4) a number of DOM element(s) of the web page that are sibling(s) of the DOM element and that are positioned after the DOM element in the DOM. Identifying the second subset of DOM element(s) in step 204 includes DOM style modification tool 112 (see FIG. 1) identifying one or more DOM elements of the web page that are related to the DOM element based on the aforementioned received or determined relation(s) and designating the identified one or more DOM elements as being in the second subset of DOM element(s).

In step 206, based on preference(s) 116 (see FIG. 1), DOM style modification tool 112 (see FIG. 1) identifies a second set of DOM element(s) of the web page that are unrelated to the DOM element(s) of the web page that include keyword 114 (see FIG. 1) (i.e., unrelated to the aforementioned first subset of DOM element(s) included in the DOM element(s) identified in step 204). In step 206, identifying the second set of DOM element(s) as being unrelated to the first subset of DOM element(s) includes DOM style modification tool 112 (see FIG. 1) analyzing preference(s) 116 (see FIG. 1) that indicate the aforementioned hierarchical relationships and determining that DOM element(s) that do not have one of the indicated relationships with any DOM element(s) in the first subset of DOM element(s) identified in step 204.

For example, DOM style modification tool 112 (see FIG. 1) identifies a DOM element that includes a keyword "Apple" and based on a preference in preference(s) 116 (see FIG. 1), identifies other, related DOM elements based on the other DOM elements being parents of the identified DOM element. Continuing the example, DOM style modification tool 112 also identifies still other DOM elements that are unrelated to the identified DOM element that includes "Apple," where the aforementioned preference indicates that being unrelated is based on a DOM element not including the keyword and not being a parent of the identified DOM element that includes the keyword.

In step 208, based on preference(s) 116 (see FIG. 1), DOM style modification tool 112 (see FIG. 1) modifies first attribute(s) of a style of the first set of DOM element(s) identified in step 204, and modifies second attribute(s) of a style of the second set of DOM element(s) identified in step 206. In one embodiment, modifying each of the first and second attribute(s) in step 208 includes modifying a corresponding CSS attribute. Modifying a CSS attribute of a DOM element in step 208 includes attaching a CSS style directly inline in an HTML document or using a separate CSS file with a global style sheet and attaching a class name that references the global style sheet.

In one embodiment, step 208 includes modifying the aforementioned first attributes only if the process of FIG. 2 is being repeated and content of the web page specified by one or more of the DOM element(s) in the first set of DOM element(s) had been hidden or otherwise removed from view in the most recent previous iteration of the process of FIG. 2. Given the previous hiding or removal from view of the one or more DOM elements, the modification of the first attributes in the current iteration of the process of FIG. 2 makes the content specified by the one or more DOM elements viewable again in display 120 (see FIG. 1).

In another embodiment, step 208 includes modifying the aforementioned second attribute(s) of the style of the second set of DOM element(s) identified in step 206, but does not include modifying the aforementioned first attribute(s) of the style of the first set of DOM element(s) identified in step 204. For example, this embodiment may be used in a scenario in which there had not been a previous iteration of the process of FIG. 2.

In one embodiment, modifying the aforementioned second attribute(s) in step 208 includes using known techniques to hide an HTML element. As a first example, step 208 may include using the CSS display property and setting the display property to "none". A second example includes using the JQUERY® hide function. A third example includes setting the CSS visibility property to "hidden". A fourth example includes using JavaScript to delete a node in the DOM tree, and saving the deleted data in case a subsequent iteration of the process of FIG. 2 needs to show the deleted data again.

In one embodiment, modifying the aforementioned first attribute(s) in step 208 includes using known techniques to show an HTML element, such as setting the CSS display property to "block", using the show function of the multi-browser jQuery® library of the JavaScript® computer programming language. JavaScript is a registered trademark of Oracle America, Inc. located in Redwood Shores, Calif., and jQuery is a registered trademark of jQuery Foundation, Inc. located in Boston, Mass.

In one embodiment, modifying the aforementioned second attribute(s) in step 208 includes modifying one or more of the following font attributes: font size, font weight, and font color, where the modified font attribute causes the content specified by the second set of DOM element(s) identified in step 206 to be more easily ignored (i.e., visually de-emphasized) than the content specified by the first set of DOM element(s) identified in step 204, when being viewed on display 120 (see FIG. 1) by a user (following step 210, described below). That is, the content specified by the first set of DOM element(s) is visually emphasized over the other content specified by the second set of DOM element(s). For example, modifying the style of the irrelevant content on the web page so that the font size and font weight is less than the font size and weight of the relevant content on the web page makes the irrelevant content easier to ignore by a user, thereby allowing the user to quickly view and understand context around keyword 114 (see FIG. 1).

In one embodiment, modifying the aforementioned second attribute(s) in step 208 allow a placement of the second set of DOM element(s) identified in step 206 into one or more twisties in a tree view in display 120 (see FIG. 1) following step 210 (described below). The one or more twisties require subsequent activation in order to view the irrelevant content (e.g., by a click by a pointing device). By employing twisties, the irrelevant content is visually de-emphasized as compared to the relevant content, which is included in display 120 (see FIG. 1) without being placed in the tree view.

In step 210, DOM style modification tool 112 (see FIG. 1) generates display 120 (see FIG. 1), which includes a result of the search for keyword 114 (see FIG. 1) on the web page. In one embodiment, DOM style modification tool 112 (see FIG. 1) generates display 120 to include content of the web page specified by the first set of DOM element(s) identified in step 204, based on the first attribute(s) modified in step 208, while using the second attribute(s) modified in step 208 to hide or otherwise remove from view other content (i.e., irrelevant content) of the web page specified by the second set of DOM element(s) identified in step 206. In one embodiment, the removal from view of the irrelevant content results in portions of the relevant content to be moved to occupy space on the web page that had formerly been occupied by the irrelevant content (i.e., step 210 results in no gaps being shown where irrelevant content has been removed).

In an alternate embodiment, DOM style modification tool 112 (see FIG. 1) generates display 120 to include content of the web page specified by the first set of DOM element(s) identified in step 204 while using the second attribute(s) modified in step 208 to visually de-emphasize other content (i.e., irrelevant content) of the web page specified by the second set of DOM element(s) identified in step 206. The visual de-emphasis of the irrelevant content includes setting the font size, font weight, or font color as described above, and/or includes placing the irrelevant content in a tree view that employs twisties as described above.

In one embodiment, preference(s) 116 (see FIG. 1) includes an indication that a DOM element corresponding to a specific type of HTML element (e.g., an image element) is not to be subjected to the attribute modifications made in step 208. For example, images that are irrelevant content can be always shown in display 120 (see FIG. 1) based on a preference indicating that the attribute modifications made to hide or otherwise remove irrelevant content do not apply to DOM elements that specify images In step 212, DOM style modification tool 112 (see FIG. 1) determines whether a new keyword or a modification to keyword 114 (see FIG. 1) is received by search tool 110 (see FIG. 1). If DOM style modification tool 112 (see FIG. 1) determines in step 212 that search tool 110 (see FIG. 1) receives a new or modified keyword, then the Yes branch of step 212 is taken, in response, DOM style modification tool 112 (see FIG. 1) clears the modifications to the first and second attribute(s) resulting from step 208, and the process subsequently repeats starting at step 204, with keyword 114 (see FIG. 1) replaced with the new or modified keyword.

If DOM style modification tool 112 (see FIG. 1) determines in step 212 that search tool 110 (see FIG. 1) does not receive a new or modified keyword, then the No branch of step 212 is taken and the process of FIG. 2 ends at step 214.

If step 212 determines that search tool 110 (see FIG. 1) receives an additional keyword to be concatenated with the aforementioned keyword 114 (see FIG. 1), where a subsequent search is to be done for keyword 114 (see FIG. 1) and the additional keyword, then in the second search, search tool 110 (see FIG. 1) searches for keyword 114 (see FIG. 1) and the additional keyword on the web page by identifying DOM element(s) of the web page that include first DOM element(s) that include the keyword and the additional keyword and optionally include related DOM element(s) that are related to the first DOM element(s) based on preference(s) 116 (see FIG. 1). Based on preference(s) 116 (see FIG. 1), DOM style modification tool 112 (see FIG. 1) identifies other DOM element(s) of the web page that are unrelated to the first DOM element(s). Based on preference(s) 116 (see FIG. 1), DOM style modification tool 112 (see FIG. 1) optionally modifies attribute(s) of a style of the identified DOM element(s) and modifies other attribute(s) of a style of the other DOM element(s). DOM style modification tool 112 (see FIG. 1) displays a result of the second search so that the displayed result includes content of the web page specified by the identified DOM element(s), and so that the displayed result (1) does not include other content of the web page specified by the other DOM element(s) that are unrelated to the first DOM element(s) in accordance with the modified other attribute(s), or (2) visually emphasizes the content specified by the identified DOM element(s) over the other content specified by the other DOM element(s) that are unrelated to the first DOM element(s) in accordance with a difference between the modified second attribute(s) and attribute(s) of a style of the identified first DOM element(s), or in accordance with a difference between the modified first and second attribute(s).

In an alternate embodiment, the process of FIG. 2 is modified to generate a display in step 210 that includes the content of the web page specified by the DOM element(s) determined to be unrelated to keyword 114 (see FIG. 1), while removing from view or visually de-emphasizing (1) other content specified by DOM element(s) that include keyword 114 (see FIG. 1) and (2) still other content specified by DOM element(s) that are related to the DOM element(s) that include keyword 114 (see FIG. 1).

In one embodiment, prior to step 202, browser 104 generates a display of the web page so that a user viewing all of the web page on display device 118 (see FIG. 1) requires the user to perform a first amount of scrolling. Step 210 includes generating display 120 (see FIG. 1) so that the display does not include other content of the web page specified by the aforementioned second set of DOM element(s) in accordance with the second attribute(s) modified in step 208, and content of the web page specified by the aforementioned first set of DOM element(s) are moved as necessary so that no gaps remain from not including the other content specified by the second set of DOM element(s). A result of generating display 120 (see FIG. 1) in step 210 is that a user viewing all of display 120 (see FIG. 1) including the result of the search requires the user to perform a second amount of scrolling. Based on the modification of the second attribute(s) in step 208 and the generation of display 120 (see FIG. 1) in step, the second amount of scrolling is substantially less than the first amount of scrolling.

In one embodiment, step 208 includes DOM style modification tool 112 (see FIG. 1) changing an attribute of the style of the second set of DOM element(s). The changed attribute is either a font size of the other content specified by the second set of DOM element(s), a font weight of the other content, or a font color of the other content, or some combination of font size, font weight and font color. A result of changing the attribute is that the difference between the modified first and second attribute(s) includes a difference between the changed attribute and a corresponding attribute of the style of the first set of DOM element(s), where generating display 120 (see FIG. 1) in step 210 includes generating display 120 (see FIG. 1) so that the display employs the difference between the changed attribute and the corresponding attribute of the style of the first set of DOM element(s) to emphasize the content specified by the first set of DOM element(s) over the other content specified by the second set of DOM element(s).

In one embodiment, modifying the second attribute(s) of the style of the second set of DOM element(s) in step 208 includes DOM style modification tool 112 (see FIG. 1) setting an attribute of the style of the second set of DOM element(s) that places the other content specified by the second set of DOM element(s) in a tree view that employs twisties, where generating display 120 (see FIG. 1) in step 210 includes generating the display to include the tree view so that the content specified by the first set of DOM element(s) is emphasized over the other content specified by the second set of DOM element(s).

Examples

FIGS. 3A-3C is an example of a result of a search for a keyword on a web page that is generated with a known keyword search technique and without using the process of FIG. 2. A known web page search feature of incorporated into a web browser receives the keyword "Apple" entered by a user. The search feature searches a web page for occurrences of the word "Apple" and highlights each occurrence of "Apple". In FIGS. 3A-3C, a highlighted occurrence of "Apple" is indicated by a rectangle surrounding "Apple". FIG. 3A includes portions 300-1 and 300-2 of the search results. Portion 300-1 includes four occurrences of the keyword "Apple". Portion 300-2 includes two occurrences of the keyword "Apple". FIG. 3B includes portions 300-3 and 300-4 of the search results (see FIG. 1). Portion 300-3 includes three occurrences of the keyword "Apple" and portion 300-4 does not include any occurrences of "Apple". FIG. 3C includes portions 300-5 and 300-6 of the search result. Portion 300-5 includes three occurrences of the keyword "Apple" and portion 300-6 does not include any occurrences of "Apple". A user has to scroll through all portions in FIGS. 3A-3C (i.e., 218 lines of text) to ensure that the user has seen all the occurrences of the keyword "Apple".

FIGS. 4A-4B is an example of a result of a search for the same keyword on the same web page used in FIGS. 3A-3C, where the result is generated with the process of FIG. 2, in accordance with embodiments of the present invention.

FIGS. 4A-4B is an example of a result of a search for the keyword "Apple" on a web page, where the search result is included in display 120 (see FIG. 1) generated by step 210 (see FIG. 2) and where the web page being searched includes the same content shown in FIGS. 3A-3C. In this example, keyword 114 in FIG. 1 is "Apple". Search tool 110 (see FIG. 1) searches the web page for occurrences of the word "Apple" and highlights each occurrence of "Apple". In FIGS. 4A-4B, a highlighted occurrence of "Apple" is indicated by a rectangle surrounding "Apple".

FIG. 4A includes portions 400-1 and 400-2 of display 120 (see FIG. 1). Portion 400-1 includes five occurrences of the keyword "Apple", which were found by the search performed in step 204 (see FIG. 2). Portion 400-2 includes four occurrences of "Apple", which were found by the search performed in step 204 (see FIG. 2). FIG. 4B includes portion 400-3 of display 120 (see FIG. 1). Portion 400-3 includes three occurrences of the "Apple", which were found by the search performed in step 204 (see FIG. 2).

In the example presented by FIGS. 4A-4B, DOM style modification tool 112 (see FIG. 1) retrieves a preference included in preference(s) 116 (see FIG. 1), which indicates that content of the web page specified by any DOM element that does not include keyword 114 (see FIG. 1) is unrelated to the keyword "Apple" and is to be removed from view, with the remaining content to be moved to fill in any gaps left by the removed content. Based on the preference, DOM style modification tool 112 (see FIG. 1) determines the DOM elements that include the keyword "Apple" in step 204 (see FIG. 2) and determines other DOM elements that do not include the keyword "Apple" in step 206 (see FIG. 2) (i.e., determines the other DOM elements as the DOM elements that are unrelated to the DOM elements that include "Apple", in accordance with the preference).

For each of the identified DOM elements that do not include "Apple", DOM style modification tool 112 (see FIG. 1) modifies a corresponding CSS style attribute so that the CSS display property is set to "none" in step 208. As a result of step 210, DOM style modification tool 112 (see FIG. 1) generates display 120 (see FIG. 1) that includes all portions of a search result in the following order: portion 400-1 (see FIG. 4A), portion 400-2 (see FIG. 4A), and portion 400-3 (see FIG. 4B). The generated portions 400-1, 400-2 and 400-3 include only those paragraphs of the web page that include the keyword "Apple"; the other paragraphs of the web page that do not include "Apple" and had been displayed in FIGS. 3A-3C are removed and are not included in portions 400-1, 400-2 and 400-3. In the places where a paragraph has been removed, DOM style modification tool 112 (see FIG. 1) moves the paragraphs that include "Apple" so that there are no gaps left by the removed paragraphs.

It should be noted that the paragraphs that include "Apple" in FIGS. 4A-4B are the same paragraphs that include "Apple" in FIGS. 3A-3C, but a user scrolling through the entire search result has to scroll through portions 400-1, 400-2 and 400-3 (i.e., 98 lines of text) instead of the 218 lines of text in portions in FIGS. 3A-3C (i.e., scrolling required to view the portions in FIGS. 4A-4B is approximately 55% less than the scrolling required to view the portions in FIGS. 3A-3C). As illustrated by examples in FIGS. 3A-3C and FIGS. 4A-4B, embodiments of the present invention provide a technique by which the required amount of scrolling needed to view an entire web page search result is significantly reduced.

Computer System

FIG. 5 is a block diagram of a computer system that is included in the system of FIG. 1 and that implements the process of FIG. 2, in accordance with embodiments of the present invention. Computer system 102 generally includes a central processing unit (CPU) 502, a memory 504, an input/output (I/O) interface 506, and a bus 508. Further, computer system 102 is coupled to I/O devices 510 and a computer data storage unit 512. CPU 502 performs computation and control functions of computer system 102, including carrying out instructions included in program code 514 to perform a method of managing a display of a result of a search for a keyword on a web page, where the instructions are carried out by CPU 502 via memory 504. CPU 502 may include a single processing unit, or be distributed across one or more processing units in one or more locations (e.g., on a client and server). Program code 514 includes program code 816 for DOM style modification tool 112 (see FIG. 1).

Memory 504 includes a known computer-readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device (e.g., monitor), keyboard, mouse, printer, speakers, handheld device, facsimile, etc. I/O devices 510 includes display device 118 (see FIG. 1). Bus 508 provides a communication link between each of the components in computer system 102, and may include any type of transmission link, including electrical, optical, wireless, etc.

I/O interface 506 also allows computer system 102 to store information (e.g., data or program instructions such as program code 514) on and retrieve the information from computer data storage unit 512 or another computer data storage unit (not shown). Computer data storage unit 512 includes a known computer-readable storage medium, which is described below. For example, computer data storage unit 512 may be a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are carried out by CPU 502 via memory 504 to manage a display of a result of a search for a keyword on a web page. Although FIG. 5 depicts memory 504 as including program code 514, the present invention contemplates embodiments in which memory 504 does not include all of code 514 simultaneously, but instead at one time includes only a portion of code 514.

Further, memory 504 may include other systems not shown in FIG. 5, such as an operating system (e.g., Linux®) that runs on CPU 502 and provides control of various components within and/or connected to computer system 102. Linux is a registered trademark of Linus Torvalds in the United States, other countries, or both.

Storage unit 512 and/or one or more other computer data storage units (not shown) that are coupled to computer system 102 may store preference(s) 116 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 504 and/or computer data storage unit 512) having computer-readable program code (e.g., program code 514) embodied or stored thereon.

Any combination of one or more computer-readable mediums (e.g., memory 504 and computer data storage unit 512) may be utilized. The computer-readable medium may be (1) a computer-readable storage medium, or (2) a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 514) for use by or in connection with a system, apparatus, or device for carrying out instructions in the program, and which does not propagate.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 514) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 514) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 514). These computer program instructions may be provided to one or more hardware processors (e.g., CPU 502) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 504 or computer data storage unit 512) that can direct a computer (e.g., computer system 102), other programmable data processing apparatus, or other devices to function in a particular manner, such that the instructions (e.g., program 514) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 514) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to managing a display of a result of a search for a keyword on a web page. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer system 102) including one or more processors (e.g., CPU 502), wherein the processor(s) carry out instructions contained in the code causing the computer system to manage a display of a result of a search for a keyword on a web page. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing a display of a result of a search for a keyword on a web page.

While it is understood that program code 514 for managing a display of a result of a search for a keyword on a web page may be deployed by manually loading directly in client, server and proxy computers (not shown) via loading a computer-readable storage medium (e.g., computer data storage unit 512), program code 514 may also be automatically or semi-automatically deployed into computer system 102 by sending program code 514 to a central server (e.g., computer system 102) or a group of central servers. Program code 514 is then downloaded into client computers (not shown) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

In one embodiment, program code 514 for managing a display of a result of a search for a keyword on a web page, which consists of program code for modifying DOM CSS styles and other program code providing known search features of browser 104 (see FIG. 1), is integrated into a client, server and network environment by providing for program code 514 to coexist with software applications (not shown), operating systems (not shown) and network operating systems software (not shown) and then installing program code 514 on the clients and servers in the environment where program code 514 will function.

The first step of the aforementioned integration of code included in program code 514 is to identify any software on the clients and servers including the network operating system (not shown) where program code 514 will be deployed that are required by program code 514 or that work in conjunction with program code 514. This identified software includes the network operating system that is software that enhances a basic operating system by adding networking features. Next, the software applications and version numbers are identified and compared to the list of software applications and version numbers that have been tested to work with program code 514. Those software applications that are missing or that do not match the correct version are upgraded with the correct version numbers. Program instructions that pass parameters from program code 514 to the software applications are checked to ensure the parameter lists match the parameter lists required by the program code 514. Conversely, parameters passed by the software applications to program code 514 are checked to ensure the parameters match the parameters required by program code 514. The client and server operating systems including the network operating systems are identified and compared to the list of operating systems, version numbers and network software that have been tested to work with program code 514. Those operating systems, version numbers and network software that do not match the list of tested operating systems and version numbers are upgraded on the clients and servers to the required level. After ensuring that the software, where program code 514 is to be deployed, is at the correct version level that has been tested to work with program code 514, the integration is completed by installing program code 514 on the clients and servers.

Another embodiment of the invention provides a method that performs the process steps on a subscription, advertising and/or fee basis. That is, a service provider, such as a Solution Integrator, can offer to create, maintain, support, etc. a process of managing a display of a result of a search for a keyword on a web page. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowchart in FIG. 2 and the block diagrams in FIG. 1 and FIG. 5 illustrate the architecture, functionality, and operation of possible implementations of systems, methods, and computer program products according to various embodiments of the present invention. In this regard, each block in the flowchart or block diagrams may represent a module, segment, or portion of code (e.g., program code 514), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a display of a result of a search for a keyword on a web page, the method comprising the steps of:
   a computer identifying a first subset of Document Object Model (DOM) element(s);
   the computer identifying a second subset of DOM element(s) as being DOM element(s) that are in a DOM of the web page and that specify portion(s) of first content of the web page that are relevant to the keyword based on each of the DOM element(s) in the second subset being a parent, a child, or a sibling in the DOM of a corresponding DOM element included in the first subset of DOM element(s), the first and second subsets of DOM elements being included in a first set of DOM elements in the DOM of the web page, the first set of DOM elements specifying the first content of the web page;
   the computer identifying a second set of DOM elements in the DOM as being DOM elements that are in the DOM and specify second content of the web page that is different from the first content of the web page and is irrelevant to the keyword based on each of the DOM elements in the second set not being the parent, child, or sibling in the DOM of the corresponding DOM element included in the first subset of DOM element(s), the first and second sets of DOM elements being mutually exclusive;
   based on the DOM elements in the second set of DOM elements not being the parent, child, or sibling in the DOM of the corresponding DOM element included in the first subset of DOM element(s), the computer modifying first attribute(s) of a style of the identified second set of DOM elements; and
   the computer generating the display of the result of the search so that the display includes, for viewing, the first content of the web page specified by the first set of DOM elements, the display including, for viewing in accordance with the modified first attribute(s), one or more paragraphs that had been previously hidden in a prior display of the web page and so that the display hides from view, in accordance with second attribute(s), the second content of the web page specified by the second set of DOM elements, the second attribute(s) being attribute(s) of a style of the identified second set of DOM elements, the second attribute(s) being modified based on the DOM elements in the second set of DOM elements not being the parent, child, or sibling in the DOM of the corresponding DOM element included in the first subset of DOM element(s), and the first attribute(s) being different from the second attribute(s).

2. The method of claim 1, further comprising the step of the computer determining relation(s) to a DOM element included in the first subset of DOM elements, the relation(s) selected from the group consisting of:
   a first number of level(s) of DOM element(s) in the DOM of the web page that are parent(s) of the DOM element;
   a second number of level(s) of DOM element(s) in the DOM of the web page that are one or more children of the DOM element;
   a third number of DOM element(s) of the web page that are sibling(s) of the DOM element and that are positioned before the DOM element in the DOM; and
   a fourth number of DOM element(s) of the web page that are sibling(s) of the DOM element and that are positioned after the DOM element in the DOM,
   wherein the step of identifying the second subset of DOM element(s) includes the computer identifying one or more DOM elements in the DOM of the web page that are related to the DOM element based on the relation(s) and based on each of the one or more DOM elements related to the DOM element being a parent of the DOM element in the first number of level(s) of DOM element(s) in the DOM, a child of the DOM element in the second number of level(s) of DOM element(s) in the DOM, a sibling of the DOM element included in the third number of DOM element(s) positioned before the DOM element in the DOM, or a sibling of the DOM element included in the fourth number of DOM element(s) positioned after the DOM element in the DOM.

3. The method of claim 1, further comprising the steps of:
subsequent to the step of generating the display, the computer receiving a second keyword for a second search for the second keyword on the web page;
in response to the step of receiving the second keyword, the computer clearing the modified attribute(s); and
subsequent to the step of clearing the modified attribute(s), the computer repeating the steps of identifying the first subset of DOM element(s), identifying the second subset of DOM element(s), and identifying the second set of DOM elements, modifying the attribute(s), and generating the display, with the repeated steps replacing the keyword with the second keyword and replacing the search with the second search.

4. The method of claim 1, further comprising the steps of:
the computer receiving a second keyword for a second search for the second keyword on the web page;
in the second search, the computer searching for the second keyword on the web page by identifying DOM element(s) in the DOM of the web page that include the second keyword;
the computer identifying other DOM element(s) in the DOM of the web page that do not include the second keyword;
based on the DOM element(s) identified as including the second keyword and the other DOM element(s) identified as not including the second keyword, the computer modifying attribute(s) of a style of the identified DOM element(s) and modifying other attribute(s) of a style of the other DOM element(s); and
the computer displaying a result of the second search so that the displayed result does not include content of the web page specified by the identified DOM element(s) that include the second keyword in accordance with the modified attribute(s), and so that the displayed result includes other content of the web page specified by the other DOM element(s) that do not include the second keyword in accordance with the modified other attribute(s).

5. The method of claim 1, further comprising providing at least one support service for at least one of creating, integrating, hosting, maintaining, and deploying computer-readable program code in the computer, the program code being executed by a processor of the computer to implement the steps of identifying the first subset of DOM element(s), identifying the second subset of DOM element(s), identifying the second set of DOM elements, modifying the first attribute(s) of the style of the identified second set of DOM elements, and generating the display of the result of the search.

6. A computer system comprising:
a central processing unit (CPU);
a memory coupled to the CPU; and
a computer-readable storage device coupled to the CPU, the storage device containing instructions that when executed by the CPU via the memory implement a method of managing a display of a result of a search for a keyword on a web page, the method comprising the steps of:
the computer system identifying a first subset of Document Object Model (DOM) element(s);
the computer system identifying a second subset of DOM element(s) as being DOM element(s) that are in a DOM of the web page and that specify portion(s) of first content of the web page that are relevant to the keyword based on each of the DOM element(s) in the second subset being a parent, a child, or a sibling in the DOM of a corresponding DOM element included in the first subset of DOM element(s), the first and second subsets of DOM elements being included in a first set of DOM elements in the DOM of the web page, the first set of DOM elements specifying the first content of the web page;
the computer system identifying a second set of DOM elements in the DOM as being DOM elements that are in the DOM and specify second content of the web page that is different from the first content of the web page and is irrelevant to the keyword based on each of the DOM elements in the second set not being the parent, child, or sibling in the DOM of the corresponding DOM element included in the first subset of DOM element(s), the first and second sets of DOM elements being mutually exclusive;
based on the DOM elements in the second set of DOM elements not being the parent, child, or sibling in the DOM of the corresponding DOM element included in the first subset of DOM element(s), the computer system modifying first attribute(s) of a style of the identified second set of DOM elements; and
the computer system generating the display of the result of the search so that the display includes, for viewing, the first content of the web page specified by the first set of DOM elements, the display including, for viewing in accordance with the modified first attribute(s), one or more paragraphs that had been previously hidden in a prior display of the web page and so that the display hides from view, in accordance with second attribute(s), the second content of the web page specified by the second set of DOM elements, the second attribute(s) being attribute(s) of a style of the identified second set of DOM elements, the second attribute(s) being modified based on the DOM elements in the second set of DOM elements not being the parent, child, or sibling in the DOM of the corresponding DOM element included in the first subset of DOM element(s), and the first attribute(s) being different from the second attribute(s).

7. The computer system of claim 6, wherein the method further comprises the step of the computer system determining relation(s) to a DOM element included in the first subset of DOM elements, the relation(s) selected from the group consisting of:
a first number of level(s) of DOM element(s) in the DOM of the web page that are parent(s) of the DOM element;
a second number of level(s) of DOM element(s) in the DOM of the web page that are one or more children of the DOM element;
a third number of DOM element(s) of the web page that are sibling(s) of the DOM element and that are positioned before the DOM element in the DOM; and
a fourth number of DOM element(s) of the web page that are sibling(s) of the DOM element and that are positioned after the DOM element in the DOM,
wherein the step of identifying the second subset of DOM element(s) includes the computer system identifying one or more DOM elements in the DOM of the web page that are related to the DOM element based on the relation(s) and based on each of the one or more DOM elements related to the DOM element being a parent of the DOM element in the first number of level(s) of DOM element(s) in the DOM, a child of the DOM element in the second number of level(s) of DOM element(s) in the DOM, a sibling of the DOM element included in the third number of DOM element(s) positioned before the DOM element in the DOM, or a sibling of the DOM element included in the fourth number of DOM element(s) positioned after the DOM element in the DOM.

8. The computer system of claim 6, wherein the method further comprises the steps of:
subsequent to the step of generating the display, the computer system receiving a second keyword for a second search for the second keyword on the web page;
in response to the step of receiving the second keyword, the computer system clearing the modified attribute(s); and
subsequent to the step of clearing the modified attribute(s), the computer system repeating the steps of identifying the first subset of DOM element(s), identifying the second subset of DOM element(s), and identifying the second set of DOM elements, modifying the attribute(s), and generating the display, with the repeated steps replacing the keyword with the second keyword and replacing the search with the second search.

9. The computer system of claim 6, wherein the method further comprises the steps of:
the computer system receiving a second keyword for a second search for the second keyword on the web page;
in the second search, the computer system searching for the second keyword on the web page by identifying DOM element(s) in the DOM of the web page that include the second keyword;
the computer system identifying other DOM element(s) in the DOM of the web page that do not include the second keyword;
based on the DOM element(s) identified as including the second keyword and the other DOM element(s) identified as not including the second keyword, the computer system modifying attribute(s) of a style of the identified DOM element(s) and modifying other attribute(s) of a style of the other DOM element(s); and
the computer system displaying a result of the second search so that the displayed result does not include content of the web page specified by the identified DOM element(s) that include the second keyword in accordance with the modified attribute(s), and so that the displayed result includes other content of the web page specified by the other DOM element(s) that do not include the second keyword in accordance with the modified other attribute(s).

10. A computer program product, comprising:
a computer-readable storage medium which is not a signal; and
a computer-readable program code stored in the computer-readable storage medium, the computer-readable program code containing instructions that are carried out by a central processing unit (CPU) of a computer system to implement a method of managing a display of a result of a search for a keyword on a web page, the method comprising the steps of:
the computer system identifying a first subset of Document Object Model (DOM) element(s);
the computer system identifying a second subset of DOM element(s) as being DOM element(s) that are in a DOM of the web page and that specify portion(s) of first content of the web page that are relevant to the keyword based on each of the DOM element(s) in the second subset being a parent, a child, or a sibling in the DOM of a corresponding DOM element included in the first subset of DOM element(s), the first and second subsets of DOM elements being included in a first set of DOM elements in the DOM of the web page, the first set of DOM elements specifying the first content of the web page;
the computer system identifying a second set of DOM elements in the DOM as being DOM elements that are in the DOM and specify second content of the web page that is different from the first content of the web page and is irrelevant to the keyword based on each of the DOM elements in the second set not being the parent, child, or sibling in the DOM of the corresponding DOM element included in the first subset of DOM element(s), the first and second sets of DOM elements being mutually exclusive;
based on the DOM elements in the second set of DOM elements not being the parent, child, or sibling in the DOM of the corresponding DOM element included in the first subset of DOM element(s), the computer system modifying first attribute(s) of a style of the identified second set of DOM elements; and
the computer system generating the display of the result of the search so that the display includes, for viewing, the first content of the web page specified by the first set of DOM elements, the display including, for viewing in accordance with the modified first attribute(s), one or more paragraphs that had been previously hidden in a prior display of the web page and so that the display hides from view, in accordance with second attribute(s), the second content of the web page specified by the second set of DOM elements, the second attribute(s) being attribute(s) of a style of the identified second set of DOM elements, the second attribute(s) being modified based on the DOM elements in the second set of DOM elements not being the parent, child, or sibling in the DOM of the corresponding DOM element included in the first subset of DOM element(s), and the first attribute(s) being different from the second attribute(s).

11. The computer program product of claim 10, wherein the method further comprises the step of the computer system determining relation(s) to a DOM element included in the first subset of DOM elements, the relation(s) selected from the group consisting of:
a first number of level(s) of DOM element(s) in the DOM of the web page that are parent(s) of the DOM element;
a second number of level(s) of DOM element(s) in the DOM of the web page that are one or more children of the DOM element;
a third number of DOM element(s) of the web page that are sibling(s) of the DOM element and that are positioned before the DOM element in the DOM; and
a fourth number of DOM element(s) of the web page that are sibling(s) of the DOM element and that are positioned after the DOM element in the DOM,
wherein the step of identifying the second subset of DOM element(s) includes the computer system identifying one or more DOM elements in the DOM of the web page that are related to the DOM element based on the relation(s) and based on each of the one or more DOM elements related to the DOM element being a parent of the DOM element in the first number of level(s) of DOM element(s) in the DOM, a child of the DOM element in the second number of level(s) of DOM element(s) in the DOM, a sibling of the DOM element included in the third number of DOM element(s) positioned before the DOM element in the DOM, or a sibling of the DOM element included in the fourth number of DOM element(s) positioned after the DOM element in the DOM.

12. The computer program product of claim 10, wherein the method further comprises the steps of:
subsequent to the step of generating the display, the computer system receiving a second keyword for a second search for the second keyword on the web page;
in response to the step of receiving the second keyword, the computer system clearing the modified attribute(s); and
subsequent to the step of clearing the modified attribute(s), the computer system repeating the steps of identifying the first subset of DOM element(s), identifying the second subset of DOM element(s), and identifying the second set of DOM elements, modifying the attribute(s), and generating the display, with the repeated steps replacing the keyword with the second keyword and replacing the search with the second search.

13. The computer program product of claim 10, wherein the method further comprises the steps of:
the computer system receiving a second keyword for a second search for the second keyword on the web page;
in the second search, the computer system searching for the second keyword on the web page by identifying DOM element(s) in the DOM of the web page that include the second keyword;
the computer system identifying other DOM element(s) in the DOM of the web page that do not include the second keyword;
based on the DOM element(s) identified as including the second keyword and the other DOM element(s) identified as not including the second keyword, the computer system modifying attribute(s) of a style of the identified DOM element(s) and modifying other attribute(s) of a style of the other DOM element(s); and
the computer system displaying a result of the second search so that the displayed result does not include content of the web page specified by the identified DOM element(s) that include the second keyword in accordance with the modified attribute(s), and so that the displayed result includes other content of the web page specified by the other DOM element(s) that do not include the second keyword in accordance with the modified other attribute(s).

* * * * *